(12) United States Patent
Lee et al.

(10) Patent No.: US 10,168,840 B2
(45) Date of Patent: Jan. 1, 2019

(54) TOUCH SCREEN PANEL AND METHOD OF MANUFACTURING THE SAME

(71) Applicant: Samsung Display Co., Ltd., Yongin-si (KR)

(72) Inventors: In-Nam Lee, Yongin-si (KR);
Choon-Hyop Lee, Yongin-si (KR);
Sung-Ku Kang, Yongin-si (KR);
Heung-Seok Go, Yongin-si (KR);
Young-Kuil Joo, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 14/834,585

(22) Filed: Aug. 25, 2015

(65) Prior Publication Data

US 2016/0195979 A1    Jul. 7, 2016

(30) Foreign Application Priority Data

Jan. 6, 2015 (KR) .................. 10-2015-0001381

(51) Int. Cl.
*G06F 1/16* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ...................................................... G06F 3/041
See application file for complete search history.

(56) References Cited

U.S. PATENT DOCUMENTS

| | | | | |
|---|---|---|---|---|
| 2010/0045613 | A1* | 2/2010 | Wu | G06F 3/044 345/173 |
| 2010/0200539 | A1* | 8/2010 | Yun | G06F 3/044 216/13 |
| 2013/0076667 | A1* | 3/2013 | Jiang | G06F 3/041 345/173 |
| 2013/0241689 | A1* | 9/2013 | Nakajima | G06F 3/044 338/47 |
| 2014/0016048 | A1 | 1/2014 | Omote et al. | |
| 2014/0028584 | A1 | 1/2014 | Park et al. | |
| 2014/0071357 | A1* | 3/2014 | Kuo | G06F 1/1643 349/12 |
| 2014/0151085 | A1* | 6/2014 | Ichiryu | H01L 31/02248 174/126.4 |

FOREIGN PATENT DOCUMENTS

| | | |
|---|---|---|
| KR | 10-2011-0109119 | 1/2011 |
| KR | 10-2013-0111598 | 10/2013 |
| KR | 10-2014-0003217 | 1/2014 |
| KR | 10-2014-0016070 | 2/2014 |

* cited by examiner

*Primary Examiner* — Carl Adams
(74) *Attorney, Agent, or Firm* — H.C. Park & Associates, PLC

(57) ABSTRACT

A touch screen panel includes a substrate including an active area and a non-active area surrounding the active area, sensing cells disposed in the active area, the sensing cells comprising a first transparent conductive layer, and connection lines disposed in the non-active area, the connection lines comprising a lower pattern comprising the first transparent conductive layer and an upper pattern disposed on the lower pattern and comprising a metal layer, in which an ionicity of the metal layer is greater than an ionicity of the first transparent conductive layer.

20 Claims, 7 Drawing Sheets

TOUCH SCREEN PANEL AND METHOD OF MANUFACTURING THE SAME

CROSS-REFERENCE TO RELATED APPLICATION

This application claims priority from and the benefit of Korean Patent Application No. 10-2015-0001381, filed on Jan. 6, 2015, which is hereby incorporated by reference for all purposes as if fully set forth herein.

BACKGROUND

Field

Exemplary embodiments of the present invention relate to a touch screen panel and a method of manufacturing the same.

Discussion of the Background

A touch screen panel may be used as an input device of a display device instead of a switch or a keyboard. The touch screen panel may be an input device that recognizes a user's contact position on a screen.

A method of implementing the touch screen panel may be divided into a resistive method and a capacitive method. The resistive touch screen panel may detect a voltage output when patterns for detecting position information are touched by an external pressure and calculate position information touched by the user as coordinates. The capacitive touch screen panel may detect a change in capacitance generated between patterns for detecting position information and calculate position information touched by the user as coordinates.

The touch screen panel may include an active area and a non-active area surrounding the active area. A sensing pattern may be formed in the active area. The sensing pattern may be used as a pattern for detecting position information. The sensing pattern may include sensing cells formed of a transparent conductive layer and a bridge pattern for connecting the sensing cells. A connection wire may be formed in the non-active area. The connection wire may be connected to the sensing pattern to transmit a signal detected by the sensing pattern to a driving circuit.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch screen panel including connection lines formed of a metal layer having a larger ionicity than an ionicity of a transparent conductive layer.

Exemplary embodiments of the present invention also provide a method of selectively etching a metal layer to prevent damage to sensing cells formed of a transparent conductive layer.

Additional aspects will be set forth in the detailed description which follows, and, in part, will be apparent from the disclosure, or may be learned by practice of the inventive concept.

According to an exemplary embodiment of the present invention, a touch screen panel includes a substrate including an active area and a non-active area surrounding the active area, sensing cells disposed in the active area, the sensing cells including a first transparent conductive layer, and connection lines disposed in the non-active area, the connection lines including a lower pattern including the first transparent conductive layer and an upper pattern disposed on the lower pattern and including a metal layer, in which an ionicity of the metal layer is greater than an ionicity of the first transparent conductive layer.

The first transparent conductive layer may include silver.

The metal layer may include aluminum.

The first transparent conductive layer may include a silver nanowire and the metal layer may include aluminum.

The touch screen panel may further include a contact improving layer disposed between the first transparent conductive layer and the metal layer.

The touch screen panel may further include a corrosion preventing layer disposed on the metal layer.

The sensing cells may include first sensing cells disposed on a first surface of the substrate and extend in a first direction, and second sensing cells on the first surface of the substrate and extend in a second direction crossing the first direction.

The touch screen panel may further include a first bridge pattern disposed on the same plane with the first sensing cells and connecting the first sensing cells to each other, a second bridge pattern crossing the first bridge pattern and connecting the second sensing cells to each other; and an insulation pattern disposed between the first bridge pattern and the second bridge pattern.

The first bridge pattern may include an aluminum layer.

The first bridge pattern may include at least one of a second transparent conductive layer disposed under the aluminum layer and a third transparent conductive layer disposed on the aluminum layer.

The sensing cells may include first sensing cells disposed on a first surface of the substrate and extend in a first direction, the first sensing cells including the first transparent conductive layer, and second sensing cells disposed on a second surface of the substrate facing the first surface of the substrate and extend in a second direction crossing the first direction, the second sensing cells including the first transparent conductive layer.

According to an exemplary embodiment of the present invention, a method of manufacturing a touch screen panel includes forming a transparent conductive layer on a substrate including an active area and a non-active area surrounding the active area, forming a metal layer having a larger ionicity than an ionicity of the transparent conductive layer on the transparent conductive layer, forming preliminary sensing cells in the active area by etching the metal layer and the transparent conductive layer with a first etching material, and forming connection lines in the non-active area, and forming sensing cells by selectively etching the metal layer of the preliminary sensing cells with a second etching material to expose the transparent conductive layer of the preliminary sensing cells.

The transparent conductive layer may include silver.

The metal layer may include aluminum.

The transparent conductive layer may include a silver nanowire and the metal layer may include aluminum.

The first etching material may include an acid etchant.

The first etching material may include nitric acid ($HNO_3$).

The second etching material may include an alkaline etchant.

The second etching material may include sodium hydroxide (NaOH).

The second etching material may include sodium hydroxide in the range of 0.001 to 50 wt %.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
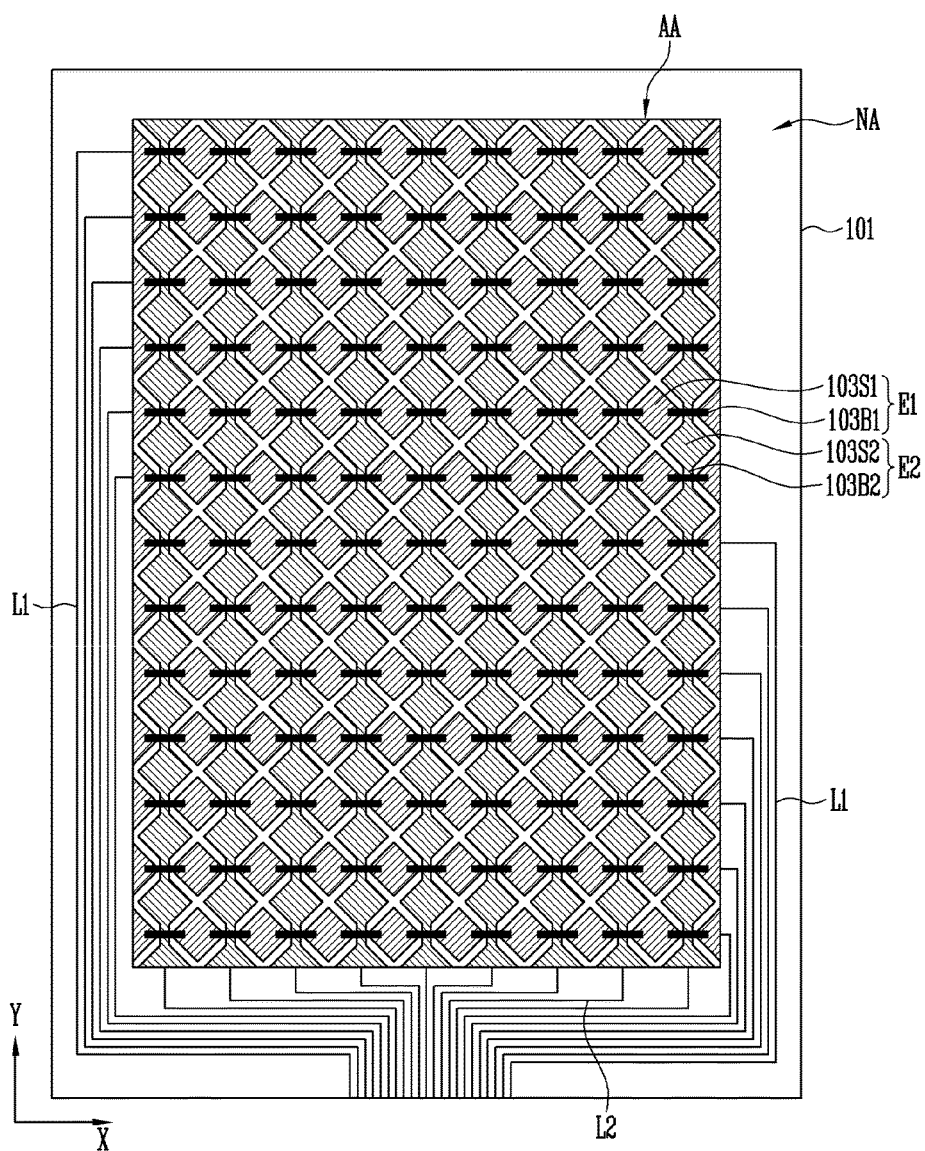
FIG. 1 is a top plan view of a touch screen panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a top plan view of a touch screen panel according to an exemplary embodiment of the present invention.

Referring to FIG. 1, the touch screen panel may include a substrate 101 including an active area AA and a non-active area NA, a first sensing electrode E1 and a second sensing electrode E2 disposed in the active area AA while crossing each other, and first connection lines L1 and second connection lines L2 disposed in the non-active area NA.

The substrate 101 may be formed of a transparent material. For example, the substrate 101 may be formed of glass or flexible polymer. Polyethylene terephthalate (PET), unstretched polycarbonate (PC), ring-shaped cyclic polyolefin (COP), polyimide (PI), and polyethylene (PE) may be used as the polymer.

The active area AA may be defined as an area on which an image is displayed, and the non-active area NA may be defined as an area surrounding the active area AA.

The first sensing electrode E1 may include first sensing cells 103S1 disposed in the active area AA and arranged in a first direction (for example, an X-axis direction), and first bridge patterns 103B1 for connecting the first sensing cells 103S1 adjacent to each other in the first direction. Each of the first sensing cells 103S1 may have a diamond shape. The first bridge pattern 103B1 may have a bar shape and be narrower than the first sensing cell 103S1.

The second sensing electrode E2 may include second sensing cells 103S2 disposed in the active area AA and arranged in a second direction (for example, a Y-axis direction) crossing the first direction, and second bridge patterns 103B2 for connecting the second sensing cells 103S2 adjacent to each other in the second direction. Each of the second sensing cells 103S2 may have a diamond shape. The second sensing cells 103S may be spaced apart from the first sensing cells 103S1. The second bridge pattern 103B2 may cross the first bridge pattern 103B1. The second bridge pattern 103B2 may have a bar shape and be narrower than the second sensing cell 103S2.

The first sensing cells 103S1 and the second sensing cells 103S2 may be alternately disposed so as not to overlap each other. The first sensing cells 103S1 and the second sensing cells 103S2 may be formed of transparent conductive layers.

The first sensing electrode E1 and the second sensing electrode E2 may be disposed on the same surface of the substrate 101. In this case, the first and second sensing cells 103S1 and 103S2 may be formed on the same plane. When the first and second sensing cells 103S1 and 103S2 are formed on the same plane, reflectivity of the touch screen panel may be uniform. The first bridge pattern 103B1 and the second bridge pattern 103B2 may be insulated from each other with an insulation pattern interposed therebetween. For example, one of the first bridge pattern 103B1 and the second bridge pattern 103B2 may be disposed on the same plane as the first and second sensing cells 103S1 and 103S2 under the insulation pattern, and the other may be disposed on the different plane from the first and second sensing cells 103S1 and 103S2 on the insulation pattern. More particularly, the second bridge pattern 103B2 may extend from the second sensing cells 103S2 and disposed under the insulation pattern. Further, the first bridge pattern 103B1 may be disposed on the insulation pattern, and disposed to be in contact with two adjacent first sensing cells 103S1.

The first connection line L1 may be formed in the non-active area NA in order to connect the first sensing electrode E1 and a driving circuit (not shown), such as a position detection circuit. The first connection line L1 may be formed of a transparent conductive layer extending from the first sensing cell 103S1 and a metal layer stacked on the transparent conductive layer.

The second connection line L2 may be formed in the non-active area NA in order to connect the second sensing electrode E2 and a driving circuit. The second connection line L2 may be formed of a transparent conductive layer extending from the second sensing cell 103S2 and a metal layer stacked on the transparent conductive layer.

The metal layer forming the first and second connection lines L1 and L2 may be formed of a metal having a larger ionicity than an ionicity of the transparent conductive layer. Accordingly, the transparent conductive layer and the metal layer may be simultaneously patterned with a first etching material or only the metal layer may be selectively etched with a second etching material. The metal layer may be a material having lower resistance than that of the transparent conductive layer.

The first connection line L2 and the second connection line L2 may be disposed on the same surface of the substrate 101.

In a capacitive touch screen panel, a change in capacitance according to a contact position of a user may be transmitted to the driving circuit through the first and second sensing electrodes E1 and E2 and the first and second connection lines L1 and L2, thereby detecting the contact position of the user.

FIGS. 2 to 5 are cross-sectional views of the touch screen panel illustrated in FIG. 1. More particularly, FIGS. 2 to 5 illustrate a cross-section of the first connection lines L1 taken in the first direction (for example, the X-axis direction) crossing the first connection lines L1, a cross-section of a part of the touch screen panel taken in an extension direction (for example, the X-axis direction) of the first sensing electrode E1, and a cross-section of the second connection lines L2 taken in the second direction (for example, the Y-axis direction) crossing the second connection lines L2.

Referring to FIGS. 2 to 5, the first sensing electrode E1, the second sensing electrode E2, the first connection line L2, and the second connection line L2 may be disposed on one surface of the substrate 101. The first sensing electrode E1, the second sensing electrode E2, the first connection line L2, and the second connection line L2 may include the transparent conductive layers forming patterns of a first group including 103L1, 103S1, 103B2, 103L2, and 103S2. The first connection line L1 and the second connection line L2 may further include a metal layer forming patterns of a second group including 105L1 and 105L2. The first sensing electrode E1 may further include a conductive layer forming the first bridge pattern 103B1.

The patterns of the first group 103L1, 103S1, 103B2, 103L2, and 103S2 may be formed on the same plane. The patterns of the first group may include a lower pattern 103L1 of the first connection line L1, the first sensing cells 103S1 of the first sensing electrode E1, the second bridge pattern 103B2 of the second sensing electrode E2, and a lower pattern L2 of the second connection line L2. Although not illustrated in the cross-sectional views of the active area AA of FIGS. 2 to 5, the patterns of the first group may further include the second sensing cells 103S2 (see FIG. 1) of the second sensing electrode E2. The lower pattern 103L1 of the first connection line L1 may extend from any one of the first sensing cells 103S1 that is adjacent to the non-active area NA. The second bridge pattern 103B2 connects the second sensing cells 103S2 (see FIG. 1) to each other as described with reference to FIG. 1, and may extend from the second sensing cells 103S2 (see FIG. 1). The lower pattern 103L2 of the second connection line L2 may extend from any one of the second sensing cells 103S2 (see FIG. 1) that is adjacent to the non-active area NA.

The transparent conductive layers forming the patterns of the first group 103L1, 103S1, 103B2, 103L2, and 103S2 may include silver. More particularly, the transparent conductive layer may be formed of a silver nanowire or a silver nano paste. The touch screen panel of FIG. 1 including the patterns 103L1, 103S1, 103B2, 103L2, and 103S2 formed of the silver nanowire may have a flexible property.

The patterns of the second group 105L1 and 105L2 may be formed on the same plane. The patterns of the second group may include the upper pattern 105L1 of the first connection line L1 and the upper pattern 105L2 of the second connection line L2. The upper patterns 105L1 and 105L2 may be formed on the lower patterns 103L1 and 103L2.

The metal layers forming the patterns of the second group 105L1 and 105L2 may be formed of a material having a larger ionicity than that of the transparent conductive layers forming the patterns of the first group 103L1, 103S1, 103B2, 103L2, and 103S2. For example, the metal layer may include aluminum. The first bridge pattern 103B1 of the first sensing electrode E1 may cross the second bridge pattern 103B2 and connect the first sensing cells 103S1 to each other as described with reference to FIG. 1. An insulation pattern 111 may be disposed between the first bridge pattern 103B1 and the second bridge pattern 103B2. Accordingly, the first bridge pattern 103B1 and the second bridge pattern 103B2 may be insulated from each other by the insulation pattern 111. The first bridge pattern 103B1 may be disposed on the insulation pattern 111, and the second bridge pattern 103B2 may be disposed under the insulation pattern 111.

The insulation pattern 111 may be formed between adjacent first sensing cells 103S1, and formed to expose the first sensing cells 103S1. The insulation pattern 111 may be formed in a bar type in the extending direction of the first bridge pattern 103B1. The first bridge pattern 103B1 may be formed to be in contact with the first sensing cells 103S1 exposed at both ends of the insulation pattern 111.

Figure 2:
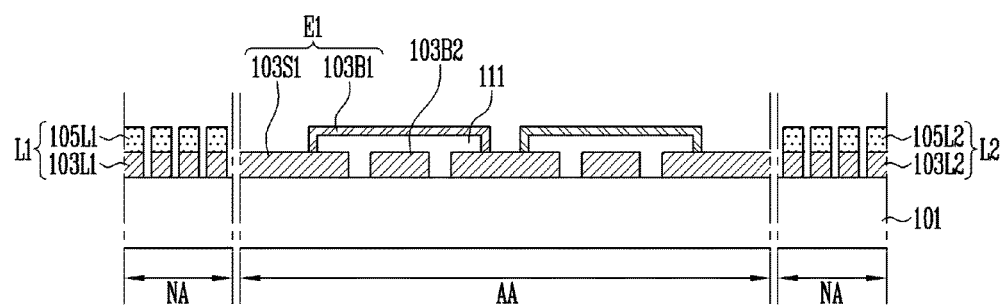
FIG. 2, FIG. 3, FIG. 4, and FIG. 5 are cross-sectional views of the touch screen panel illustrated in FIG. 1.
Figure 5:
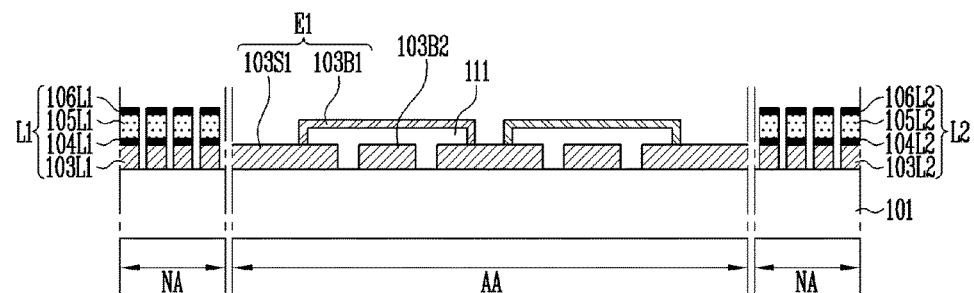

The first bridge pattern 103B1 may be formed of a metal layer having lower resistance than that of the transparent conductive layer, and formed of a single layer as illustrated in FIG. 2 and FIG. 5. An aluminum layer may be used as the metal layer having lower resistance than that of the transparent conductive layer.

Figure 3:
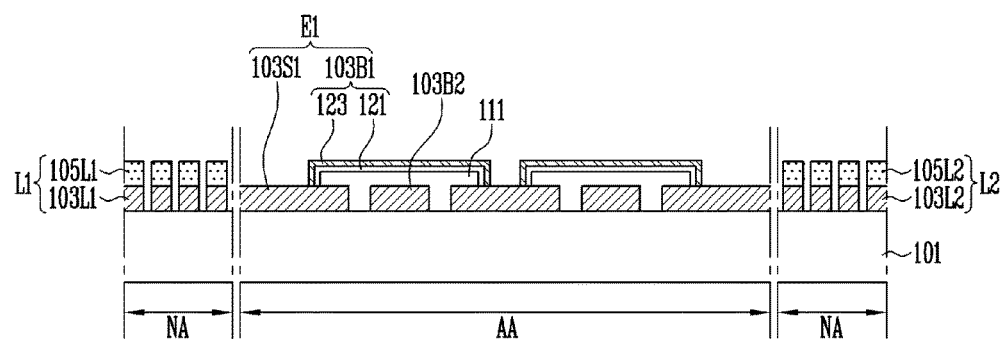

Referring to FIG. 3, the first bridge pattern 103B1 may be formed of dual layers. The dual layers may include a transparent conductive layer 121 for improving transmittance of the first bridge pattern 103B1 and a metal layer 123 formed on the transparent conductive layer 121 for reducing resistance of the first bridge pattern 103B1. As the transparent conductive layer 121 of the first bridge pattern 103B1, an indium tin oxide (ITO) and an indium zinc oxide (IZO) may be used. As the metal layer 123 of the first bridge pattern 103B1, an aluminum layer having lower resistance than that of the transparent conductive layer 121 may be used.

Figure 4:
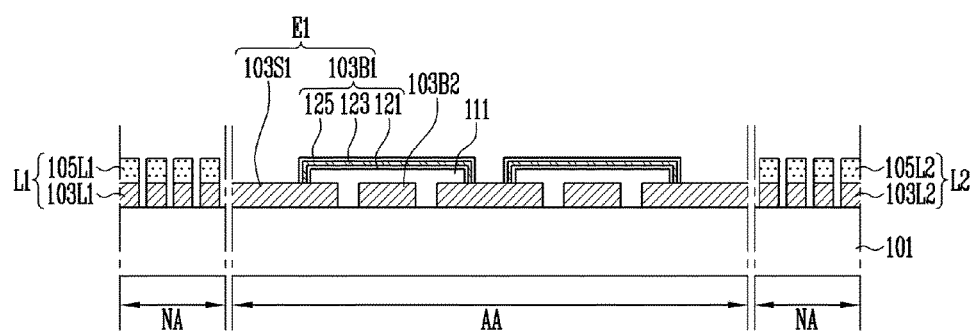

Referring to FIG. 4, the first bridge pattern 103B1 may be formed of triple layers. The triple layers may include the metal layer 123, and transparent conductive layers 121 and 125 stacked on an upper portion and a lower portion of the metal layer 123, respectively. The metal layer 123 is formed to reduce resistance of the first bridge pattern 103B1, and may be formed of an aluminum layer. The transparent conductive layers 121 and 125 disposed on the upper portion and the lower portion of the metal layer 123 are formed to improve transmittance of the first bridge pattern 103B1 and prevent the metal layer 123 from being oxidized, and may be formed of an indium tin oxide (ITO), an indium zinc oxide (IZO), and the like. According to an exemplary embodiment of the present invention, the first bridge pattern 103B1 may be formed of multiple layers including more than the triple layers.

Referring to FIG. 5, contact improving layers 104L1 and 104L2 may be further formed under the upper pattern 105L1 of the first connection line L1 and the upper pattern 105L2 of the second connection line L2 formed of the metal layer, respectively. Further, corrosion preventing layers 106L1 and 106L2 may be further formed on the upper pattern 105L1 of the first connection line L1 and the upper pattern 105L2 of the second connection line L2 formed of the metal layer, respectively. The contact improving layers 104L1 and 104L2 and the corrosion preventing layers 106L1 and 106L2 may be formed of molybdenum (Mo), titanium (Ti), and chrome (Cr).

Figure 6:
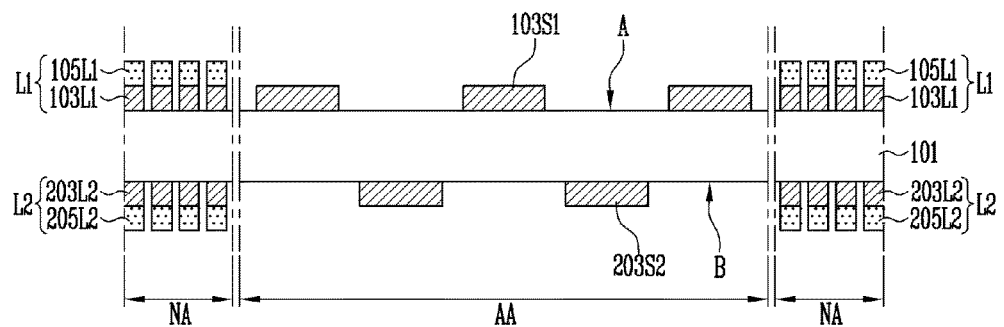
FIG. 6 is a cross-sectional view of the touch screen panel according to an exemplary embodiment of the present invention.

Referring to FIG. 6, according to an exemplary embodiment of the present invention, the first sensing electrode E1 (see FIG. 1) may be formed on a first surface of the substrate 101 and the second sensing electrode E2 (see FIG. 1) may be formed on a second surface facing the first surface of the substrate 101.

FIG. 6 is a cross-sectional view of a touch screen panel according to an exemplary embodiment of the present invention. FIG. 6 illustrates a cross section of a non-active area NA taken along a direction crossing first and second connection lines L1 and L2, and a cross section of an active area AA taken along a diagonal direction of the touch screen panel in an area in which the first and second connection lines L1 and L2 overlap.

As illustrated in FIG. 6, first sensing cells 103S1 of a first sensing electrode and a first bridge pattern (not shown) may be disposed on the same plane on a first surface A of a substrate 101. Although not illustrated in FIG. 6, a layout of the first bridge pattern may be substantially the same as the layout of the first bridge pattern illustrated in FIG. 1. The first bridge pattern may extend from the first sensing cells 103S1. Further, second sensing cells 203S2 of a second sensing electrode and a second bridge pattern (not shown) may be disposed on the same plane on a second surface B facing the first surface A of the substrate 101. Although not illustrated in FIG. 6, a layout of the second bridge pattern may be substantially the same as the layout of the second bridge pattern illustrated in FIG. 1. The second bridge pattern may extend from the second sensing cells 203S1. The first and second sensing electrodes may be insulated from each other by the substrate 101. The forms of the first sensing electrode and the second sensing electrode including the forms of the first sensing cells 103S1 and the second sensing cells 203S2 may be variously changed. For example, some of the first sensing cells 103S1 and some of the second sensing cells 203S2 may overlap each other.

The first connection line L1 may be formed on the first surface A of the substrate 101, and the second connection line L2 may be formed on the second surface B facing the first surface A of the substrate 101. The first connection line L1 may include a lower pattern 103L1 and an upper pattern 105L1 stacked on the lower pattern 103L1. The second connection line L2 may include a lower pattern 203L1 and an upper pattern 205L1 stacked on the lower pattern 203L2. The first connection line L1 and the second connection line L2 may overlap each other.

The lower pattern 103L1 of the first connection line L1, the first bridge pattern (not shown) of the first sensing electrode, and the first sensing cells 103S1 may configure patterns of a first group, and include a transparent conductive layer. The patterns of the first group 103S1 and 103L1 may be formed on the same plane. The lower pattern 103L1 of the first connection line L1 may extend from any one of the first sensing cells 103S1 that is adjacent to the non-active area NA. The first bridge pattern connects the first sensing cells 103S1 to each other as described with reference to FIG. 1, and may extend from the first sensing cells 103S1.

The lower pattern 203L2 of the second connection line L2, the second bridge pattern (not shown) of the second sensing electrode, and the second sensing cells 203S2 may configure patterns of a second group, and include a transparent conductive layer. The patterns of the second group 203S2 and 203L2 may be formed on the same plane. The lower pattern 203L2 of the second connection line L2 may extend from any one of the second sensing cells 203S1 that is adjacent to the non-active area NA. The second bridge pattern connects the second sensing cells 203S2 to each other as described with reference to FIG. 1, and may extend from the second sensing cells 203S2.

The transparent conductive layers forming the patterns of the first group 103S1 and 103L1 and the patterns of the second group 203S2 and 203L2 may include silver. More particularly, the transparent conductive layer may be formed of a silver nanowire or a silver nano paste. The touch screen panel including the patterns of the first group 103S1 and 103L1 and the patterns of the second group 203S2 and 203L2 formed of the silver nanowire may have a flexible property.

The upper patterns 105L1 and 205L2 may be formed on the lower patterns 103L1 and 203L2. The upper patterns 105L1 and 205L2 may be formed of metal layers. The metal layers may be formed of a material having a larger ionicity than an ionicity the transparent conductive layers forming the patterns of the first group 103S1, 103B1 (see FIG. 1), and 103L1 and the patterns of the second group 203S2 and 203L2. For example, the metal layer may include aluminum. Although not illustrated in FIG. 6, a contact improving layer may be further formed between the transparent conductive layer and the metal layer. A corrosion preventing layer may be further formed on the metal layer. The contact improving layer and the corrosion preventing layer may be formed of molybdenum (Mo), titanium (Ti), chrome (Cr), and the like.

FIGS. 7 to 11 are views illustrating a method of manufacturing a touch screen panel according to an exemplary embodiment of the present invention.

Figure 7:
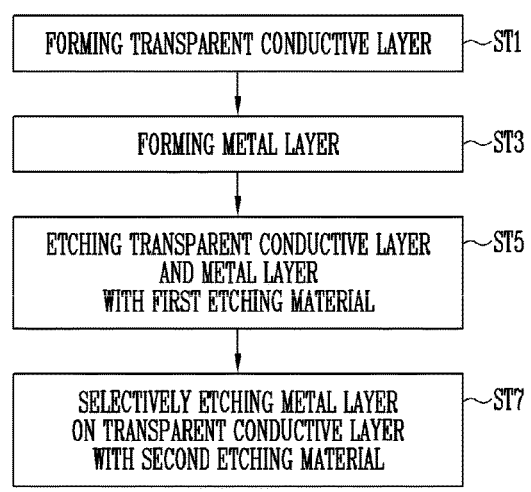
FIG. 7, FIG. 8A, FIG. 8B, FIG. 8C, FIG. 8D, FIG. 9, FIG. 10A, FIG. 10B, and FIG. 11 are views illustrating a method of manufacturing a touch screen panel according to exemplary embodiments of the present invention.
Figure 8A:
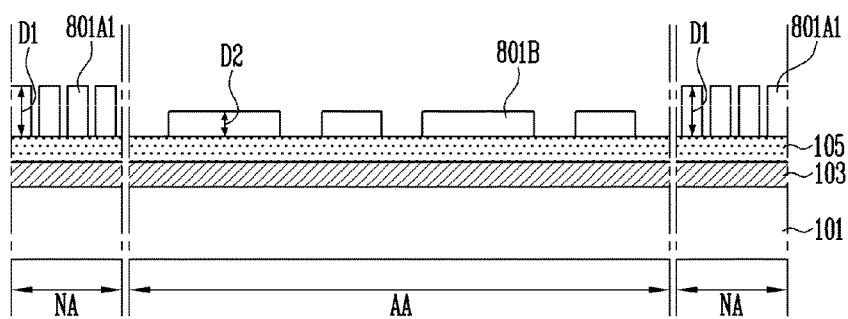

Referring to FIGS. 7 and 8A, a transparent conductive layer 103 is formed on a first surface of a substrate 101 including an active area AA and a non-active area NA illustrated in FIG. 1 (ST1). The transparent conductive layer 103 may include silver. More particularly, the transparent conductive layer 103 may be formed of a silver nanowire or a silver nano paste.

Next, a metal layer 105 is formed on the transparent conductive layer 103 (ST3). The metal layer 105 may be formed by printing a metal paste by screen printing and the like. In this case, since the metal layer 105 may be printed in a desired pattern, it may be possible to expose the active area AA (see FIG. 1) and form connection lines formed of the metal paste, even when the metal layer 105 is not selectively etched. However, when the connection lines are formed of the metal paste, thicknesses and widths of the connection lines may be increased in order to secure low resistance of the connection lines. Accordingly, an area of the non-active area NA (see FIG. 1) may be increased. The metal layer 105 formed by a deposition method has lower resistance than that of a metal layer formed of a metal paste. According to an exemplary embodiment of the present invention, the metal layer 105 may be formed by the deposition method in order to form thin and narrow connection lines having a low resistance.

The metal layer 105 formed by the deposition method may need to be simultaneously etched together with the transparent conductive layer 103, and selectively etched without causing a damage to the transparent conductive layer 103. Accordingly, the metal layer 105 may be formed of a material having a larger ionicity than that of the transparent conductive layer 103. For example, the metal layer 105 may include aluminum. Hereinafter, subsequent etching processes will be described with reference to the transparent conductive layer 103 including silver and the metal layer 105 including aluminum.

Next, a photoresist pattern 801A1 and 801B may be formed on the metal layer 105. The photoresist pattern 801A1 and 801B may be formed as patterns for blocking areas on which preliminary sensing cells, preliminary bridge patterns, and connection lines may be formed, and opening the remaining area. The photoresist pattern 801A1 and 801B may include a first area having a first thickness D1 and a second area having a second thickness D2 smaller than the first thickness D1, respectively. The first area of the photoresist pattern 801A1 may block an area on which the connection lines are to be formed, and the second area of the photoresist pattern 801B may block the area on which the preliminary sensing cells and the preliminary bridge patterns may be formed. The photoresist patterns 801A and 801B respectively having the first and second thicknesses D1 and D2 may be formed by an exposure process and a development process by using a half-tone mask.

Figure 8B:
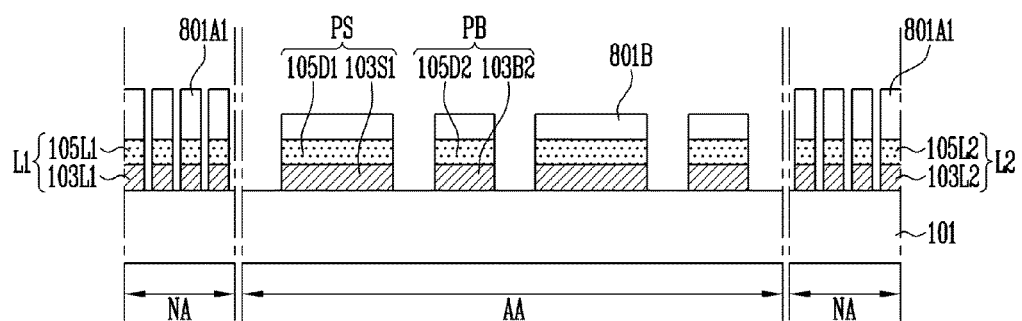

Referring to FIGS. 7 and 8B, the preliminary sensing cells PS and the preliminary bridge patterns PB are formed in the active area AA (see FIG. 1), and the connection lines L1 and L2 are formed in the non-active area NA (see FIG. 1) by etching the transparent conductive layer and the metal layer with a first etching material (ST5). In operation ST5, the photoresist pattern 801A1 and 801B may be used as etch barriers.

The preliminary sensing cells PS and the preliminary bridge patterns PB may be formed under the second area of the photoresist pattern 801B. The preliminary sensing cells PS may be formed in a stacked structure of a transparent conductive layer pattern 103S1 and a metal layer pattern 105D1. The preliminary bridge patterns PB may be formed in a stacked structure of a transparent conductive layer pattern 103B2 and a metal layer pattern 105D2. The connection lines L1 and L2 may be formed under the first area of the photoresist pattern 801A1. The connection lines L1 and L2 may be formed in a stacked structure of transparent conductive layer patterns 103L1 and 103L2 and metal layer pattern 105L1 and 105L2, respectively.

The first etching material may include an acid etchant that may etch the transparent conductive layer 103 and the metal layer 105. More particularly, the first etching material may include nitric acid ($HNO_3$). The metal layer formed of aluminum may be etched by nitric acid. Further, nitric acid may react to silver as expressed by Reaction Formula 1 below, and the transparent conductive layer formed of silver may be etched.

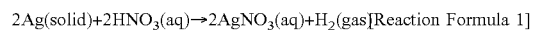

$2Ag(solid)+2HNO_3(aq) \rightarrow 2AgNO_3(aq)+H_2(gas)$ [Reaction Formula 1]

The preliminary sensing cells PS may be formed to have the patterns of the first and second sensing cells 103S1 and 103S2 as illustrated in FIG. 1, and the preliminary bridge patterns PB may be formed to have the pattern of the second bridge patterns 103B2 as illustrated in FIG. 1. Further, the connection line may be formed to have the patterns of the first connection line L1 and the second connection line L2 as illustrated in FIG. 1.

Figure 8C:
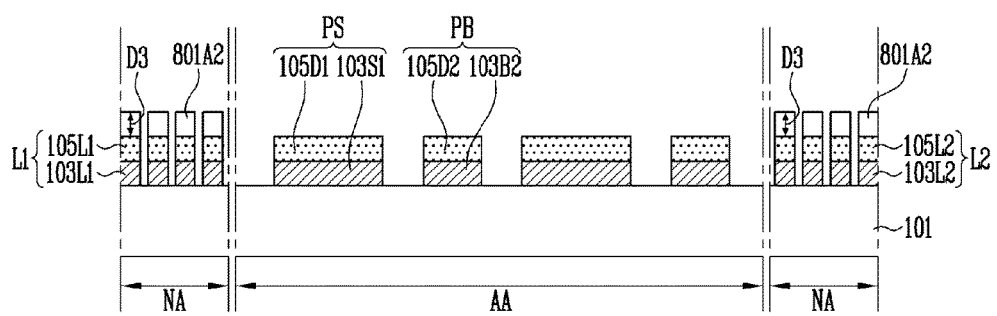

Referring to FIGS. 7 and 8C, after operation ST5, the preliminary sensing cells PS and the preliminary bridge patterns PB are exposed by removing the second area of the photoresist pattern 801B. When the second area of the photoresist pattern 801B is removed, a portion of the first area of the photoresist pattern 801A2 may be removed to have a third thickness D3 which is smaller than the first thickness D1 (see FIG. 8A). The remaining first area of the photoresist pattern 801A1 with the third thickness D3 may block the connection lines L1 and L2.

Figure 8D:
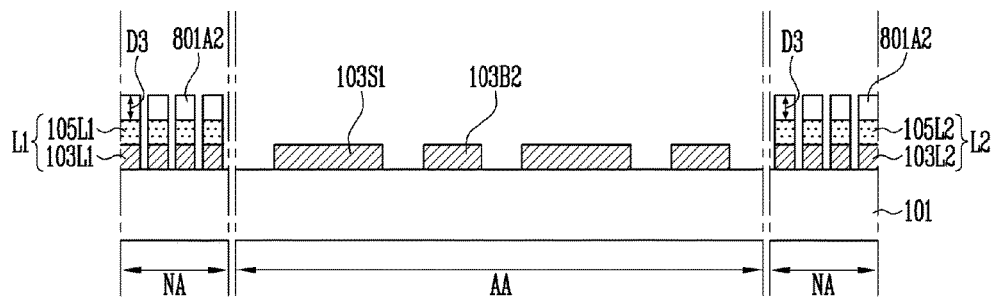

Referring to FIGS. 7 and 8D, the metal layer patterns 105D1 and 105D2 of the preliminary sensing cells PS and the preliminary bridge patterns PB are selectively etched with a second etching material, so that the transparent conductive layer patterns 103S1 and 103B2 of the preliminary sensing cells PS and the preliminary bridge patterns PB are exposed. Accordingly, the transparent conductive layer patterns 103S1 and 103B2 of the preliminary sensing cells PS and the preliminary bridge patterns PB may be exposed as sensing cells and bridge patterns (ST7).

The remaining first area of the photoresist pattern 801A2 may be used as an etch barrier in operation ST7. The second etching material may include an alkaline etchant which may selectively etch the metal layer. More particularly, the second etching material may include sodium hydroxide (NaOH). The metal layer formed of aluminum may be etched by sodium hydroxide. Further, sodium hydroxide reacts to aluminum as expressed by Reaction Formula 2 below, and the metal layer formed of aluminum may be selectively etched.

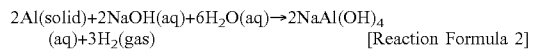
[Reaction Formula 2]

After operation ST7, the remaining first area of the photoresist pattern 801A2 may be removed. Accordingly, the first and second sensing cells 103S1 and 103S2 (see FIG. 1) and the second bridge patterns 103B2 (see FIG. 1) may be formed.

Figure 9:
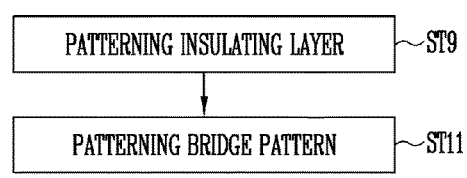
Figure 10A:
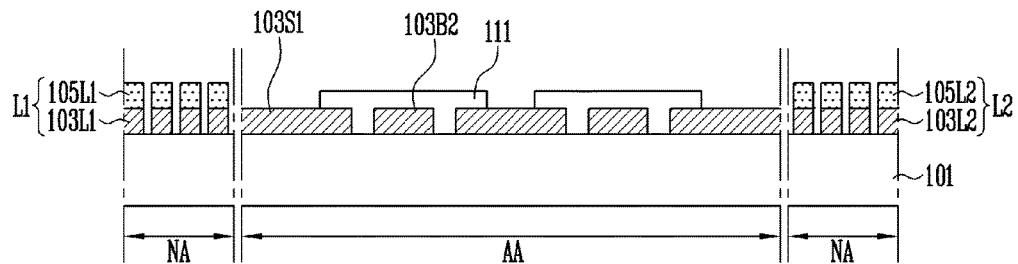

Referring to FIGS. 9 and 10A, after operation ST7, an insulation pattern 111 may be formed by forming an insulation layer and patterning the insulation layer (ST9).

Figure 10B:
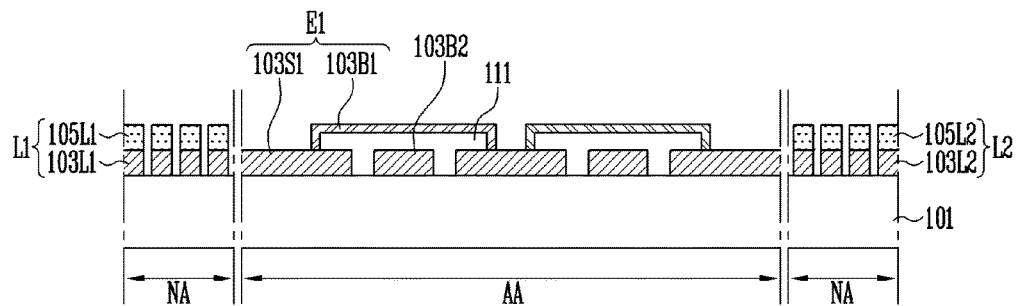

Referring to FIGS. 9 and 10B, a conductive layer may be formed on the insulation pattern 111 and patterned to form the first bridge pattern 103B1 (ST11).

Figure 11:
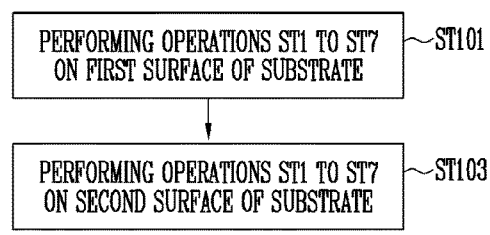

Referring to FIG. 11, in order to form the touch screen panel having the structure illustrated in FIG. 6, operations ST1 to ST7 described with reference to FIGS. 7 to 8D may be sequentially performed on the first surface of the substrate 101 (ST101). Accordingly, the first sensing cells 103S1 (see FIG. 6) and the first connection line L1 (see FIG. 6) may be formed on the first surface of the substrate 101.

The operations ST1 to ST7 described with reference to FIGS. 7 to 8D may then be sequentially performed on a second surface facing the first surface of the substrate 101 (ST103). Accordingly, the second sensing cells 103S2 (see FIG. 6) and the second connection line L2 (see FIG. 6) may be formed on the second surface of the substrate 101.

According to the exemplary embodiments of the present invention, the connection line may be formed by using the metal layer having a larger ionicity than that of the transparent conductive layer, to selectively etch the metal layer so that the transparent conductive layer is exposed and the metal layer is removed in the area in which the sensing cell is disposed.

According to the exemplary embodiments of the present invention, the metal layer may be selectively etched to decrease a damage of the sensing cell formed of the transparent conductive layer.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising:
    a substrate comprising an active area and a non-active area surrounding the active area;
    sensing cells disposed in the active area, the sensing cells comprising a first transparent conductive layer; and
    connection lines disposed in the non-active area, the connection lines comprising:
        an upper pattern comprising a metal layer; and
        a lower pattern disposed between the substrate and the upper pattern, and comprising the first transparent conductive layer formed directly on the substrate,
    wherein an ionicity of the metal layer is greater than an ionicity of the first transparent conductive layer.

2. The touch screen panel of claim 1, wherein the first transparent conductive layer comprises silver.

3. The touch screen panel of claim 1, wherein the metal layer comprises aluminum.

4. The touch screen panel of claim 1, wherein the first transparent conductive layer comprises a silver nanowire and the metal layer comprises aluminum.

5. The touch screen panel of claim 1, further comprising a contact improving layer disposed between the first transparent conductive layer and the metal layer.

6. The touch screen panel of claim 1, further comprising a corrosion preventing layer disposed on the metal layer.

7. The touch screen panel of claim 1, wherein the sensing cells comprise:
    first sensing cells disposed on a first surface of the substrate and extending in a first direction; and
    second sensing cells disposed on the first surface of the substrate and extending in a second direction crossing the first direction.

8. The touch screen panel of claim 7, further comprising:
    a first bridge pattern connecting the first sensing cells to each other;
    a second bridge pattern crossing the first bridge pattern and connecting the second sensing cells to each other; and
    an insulation pattern disposed between the first bridge pattern and the second bridge pattern.

9. The touch screen panel of claim 8, wherein the first bridge pattern comprises an aluminum layer.

10. The touch screen panel of claim 9, wherein the first bridge pattern further comprises at least one of a second transparent conductive layer disposed under the aluminum layer and a third transparent conductive layer disposed on the aluminum layer.

11. The touch screen panel of claim 1, wherein the sensing cells comprise:
    first sensing cells disposed on a first surface of the substrate and extending in a first direction, the first sensing cells comprising the first transparent conductive layer; and
    second sensing cells disposed on a second surface of the substrate facing the first surface and extending in a second direction crossing the first direction, the second sensing cells comprising the first transparent conductive layer.

12. A method of manufacturing a touch screen panel, the method comprising:
- forming a transparent conductive layer directly on an entire upper surface of a substrate comprising an active area and a non-active area surrounding the active area;
- forming a metal layer having a larger ionicity than an ionicity of the transparent conductive layer on the transparent conductive layer;
- forming preliminary sensing cells in the active area by etching the metal layer and the transparent conductive layer with a first etching material, and forming connection lines in the non-active area; and
- forming sensing cells by selectively etching the metal layer of the preliminary sensing cells with a second etching material to expose the transparent conductive layer of the preliminary sensing cells.

13. The method of claim 12, wherein the transparent conductive layer comprises silver.

14. The method of claim 12, wherein the metal layer comprises aluminum.

15. The method of claim 12, wherein the transparent conductive layer comprises a silver nanowire and the metal layer comprises aluminum.

16. The method of claim 12, wherein the first etching material comprises an acid etchant.

17. The method of claim 12, wherein the first etching material comprises nitric acid (HNO3).

18. The method of claim 12, wherein the second etching material comprises an alkaline etchant.

19. The method of claim 12, wherein the second etching material comprises sodium hydroxide (NaOH).

20. The method of claim 19, wherein the second etching material comprises sodium hydroxide in a range of 0.001 to 50 wt %.

* * * * *